Jan. 24, 1950

J. H. KORB 2,495,263

DIAPHRAGM SHUTTER SCOTOMETER

Filed Nov. 17, 1947

Inventor
JOHN HERMAN KORB

By D. E. Snyder
Attorney

Patented Jan. 24, 1950

2,495,263

UNITED STATES PATENT OFFICE 2,495,263

DIAPHRAGM SHUTTER SCOTOMETER

John H. Korb, United States Navy

Application November 17, 1947, Serial No. 786,489

4 Claims. (Cl. 88—20)

(Granted under the act of March 3, 1883, as amended April 30, 1928; 370 O. G. 757)

This invention relates to a testing device and more particularly to a device for testing individual visual dark adaptability, by providing a means of determining the extent or size of the physiological blindspot or central scotoma corresponding to the cone area of the dark adapted retina.

An object of the invention is to provide a device for testing individual visual dark adaptability, or ability to see in the dark, providing accuracy in its measurements.

Another object is to provide a test device for determining dark adaptability of individuals by which each test is completed in a short interval of time.

Still another object of the invention is the provision of a device for accurately and quickly testing for individual dark adaptability, which is simple to operate under conditions of darkness, and is readily comprehended by the subject.

A further object of the invention is the provision of an eye testing device for determining individual dark adaptability which will further give an estimate or measurement of the size of the central scotoma corresponding to the cone area or fovea when illumination is dim and at a scotopic level, so that individuals may be readily classified on this basis.

A still further object of the invention is to provide a device which is compact, simple in construction, light in weight and is operated as a mobile unit free from dependence on any external elements, such as external electric current, for operation.

Other objects and features of the invention will be brought out in the ensuing description of a preferred exemplary embodiment, as illustrated in the accompanying drawings in which.

Figure 1:
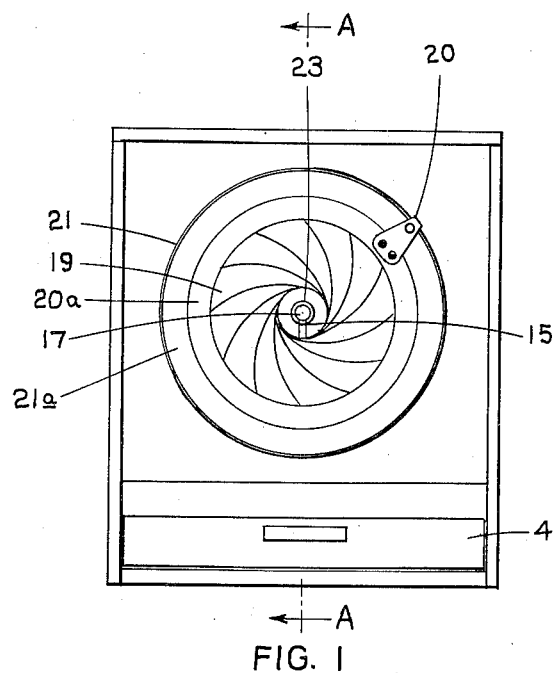
Fig. 1 is a front elevation of the instrument showing the diaphragm shutter in partial open position.

It has been found from past studies of night visual scotometry that when the visual field is charted on a completely dark adapted individual, with a target the luminosity of which is considerably below the intensity of photopic level, it is possible to separate those who have good vision at night from those whose night vision is poor. It has also been reported by tests that individuals who see well in darkness or dim illumination have a very small central scotoma and a large peripheral visual field. On the other hand, those individuals who have poor vision in darkness or dim illumination were reported to have a large central scotoma with a constriction of the peripheral visual field.

A number of devices and methods have been devised for testing visual dark adaptability in individuals but none of these devices meet the requirements presented, namely, a compact, simply constructed mobile unit, particularly adapted for use in the field, such as in testing military personnel or the like for special duties requiring good or acute night vision. The present invention is designed to meet this need.

The present invention provides a device and method which presents to the subject a central fixation point, and initially completely obscured light from a background of fixed brightness is gradually presented to the subject, around the central fixation point, by a varying sized aperture.

According to the invention, a light source preferably comprising a radium plaque of a desired brightness which may be controlled by a neutral filter placed over the front of the plaque, is mounted in a black case or housing. A diaphragm shutter operated by a lever on the front of the device, permits the operator to open or close an aperture before the center of the plaque. A housing projects through the aperture center, containing a small red light which acts as a point of fixation. The red light may desirably be reduced in brightness to low cone levels. This may be done by means of filters of various shades of red. The fixation light is operated desirably by dry cells disposed in the casing below the plaque aperture. A hinged back cover provides access to the plaque enabling the removal of any protective opaque covers prior to testing. Scale markings in degrees of aperture are preferably provided along the path of the operating lever for the shutter.

The device and process of the present invention involves directing the subject's gaze at the fixation light with the plaque completely obscured by the closed shutter. The shutter is gradually opened until the subject reports detecting some portion of the light from self-luminous source, revealed behind or adjacent the point of fixation. The device and process of the invention thus operates by moving from a non-seeing state to a seeing state.

Referring in detail to the exemplary embodiment shown, the device of the present invention comprises a housing 1 of desired size and shape and which may be constructed of wood or plastic or any suitable material. The base of the housing 1 is desirably partitioned so as to form an enclosed chamber 2. The chamber 2 is adapted to receive a desired number of small batteries 3 such as flashlight batteries. The front of this chamber is desirably in the form of a removable panel 4 thus providing access to the batteries. The back member 5 of the housing is affixed preferably to the top member 6 of the enclosed chamber desirably by hinges 7 at its lower end. Spacing strips 24 are desirably affixed to the inner surface of the back member 5 near the top and bottom thereof, and the back is fitted to close tightly to prevent leakage of outside light into the housing.

Within the housing 1 adjacent the back member 5 is removably mounted a frame 8. The frame 8 carries a vertically disposed self-luminous element such as a radium plaque 9 and is held in position by the spacing strips 24 on the back member 5. For removing the frame 8 and the radium plaque from the housing a tab 12 or other suitable finger grip is provided on the rear face of the frame 8. A suitable light filter 13 is preferably affixed to the forward face of the frame 8, thus providing filtered light of desired intensity from the radium plaque 9 for presentation to the subject. In front of the frame 8 is a spacing member 14, through the lower portion of which spacing member is inserted a vertically disposed strip of metal 15. The metal strip or narrow support arm 15 mounts at its upper end a light bulb housing 16, the strip acting to connect the light bulb housing with the batteries 3.

The light bulb housing is adapted to carry desirably a small red light bulb 17 and is provided with shielding means, comprising the bulb receiving portion of the light bulb housing 16, to prevent the light rays from the bulb 17 from striking the radium plaque. The light bulb housing 16 is so disposed and constructed as to project the light rays forwardly from substantially the center point of the front of the housing 1 and is provided with a ring of light sealing material 23 such as sponge rubber or the like around its outer circumference.

In front of the spacing member 14 is mounted another frame member 18 having affixed thereon an iris diaphragm shutter 19 or the like. The shutter carries a suitable operating means preferably comprising a lever 20 designed to be moved arcuately to open or close the shutter members or blades around the light bulb housing, the blades being adapted to press against the light sealing material 23 when in closed position. This provides for the passage of any desired controlled amount of light from the radium plaque, to be viewed around the red light 17. The lever 20 is secured by screws or the like to a rotary ring 20a suitably connected to operate the blades of the iris diaphragm shutter.

Figure 2:
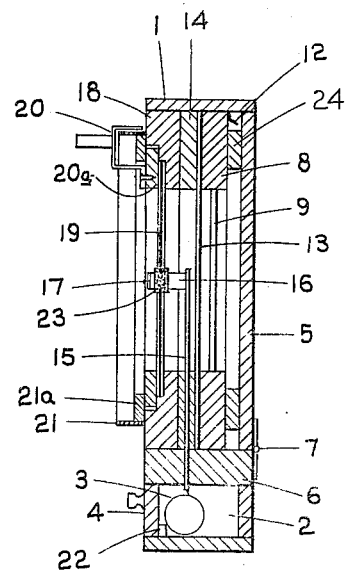
Fig. 2 is a sectional view taken substantially on line A—A of Fig. 1 and showing the diaphragm shutter in closed position.
Figure 3:
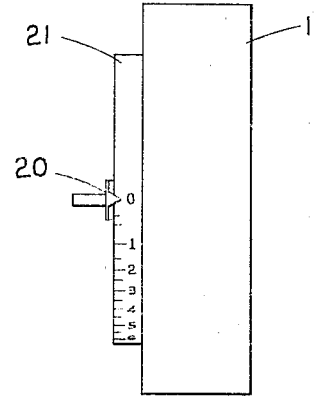
Fig. 3 is a plan view of Fig. 1 with the diaphragm shutter shown in closed position.

A calibrated ring 21, desirably made of metal, is carried on the face of the housing 1. The calibrations on the ring 21 may desirably be marked with radioactive ink for viewing by the operator in conditions of darkness. The ring is so disposed as to surround the diaphragm shutter and is preferably adapted to indicate the size of the opening, as in degrees of aperture, at any position of the shutter control means 20. A ring support member 21a supports ring 21 and is suitably attached to frame member 18, and overlies the gap between the frame 18 and the rotary ring 20a, preventing light passage. When radioactive ink is used for calibrating the ring 21 it will be desirable to use a ring having suitable shield means such as an upturned flange around its outer edge acting to shield the light from the ink from the test subject. If desired a hinged cover plate (not shown) may be mounted on the front of the housing thus providing a cover for the entire front of the device or for the shutter member only. A light switch 22 for controlling the red light 17 can be placed at any desirable position, for example, in the battery enclosing chamber 2 as shown diagrammatically in Fig. 2. A small shielded light (not shown), may be incorporated in the back of the instrument to enable the operator to record the test scores without the light being visible to the test subject.

For operating the device the test subject is kept in total darkness until completely dark adapted. The operator then places the subject before the device at a predetermined distance and turns on the red light. At this time the diaphragm shutter is completely closed, thus preventing any light from the radium plaque from passing through the front of the instrument. Then, with the low intensity red light acting as a fixation point, the subject is instructed to tell the operator when he sees any light from the self-luminous area appear behind the red light fixation point. The individual is told not to wait until a complete circle of light becomes visible around the fixation point, since a threshold response is the objective of the test.

The operator then gradually opens the shutter until the subject indicates that he can see some light from the radium plaque appear adjacent or around the red light. The operator then takes the shutter setting from the calibrated ring member, and by comparing this reading with the average, can determine the individual's dark adaptability, as well as an estimate or measurement of the size of the central scotoma of the subject's eyes. The central scotoma may be defined as the physiological blind-spot corresponding to the cone area or fovea of the dark-adapted retina.

It is to be noted that the red light used as a fixation point does not affect the dark adaptation of the eyes, as red stimulates the cones of the eyes only. As the rods of the eyes are the organs for distinguishing light and dark, they will be unaffected by the red light, but will react to the light from the radium plaque. The radium plaque with the filter on its face preferably has a brightness of not more than 8.0 log micromicrolamberts nor less than 2.5 log micromicrolamberts but may be varied to meet various test needs. The testing distance of the subject from the device desirably may be from approximately three feet to approximately five feet, but may be varied as test conditions require.

Scores recorded for each subject with the diaphragm shutter scotometer of the present invention desirably may be the average of twenty diameters of the foveal scotoma. The averages of test-retest scores arranged in groups are presented, as an example, in the following table to indicate score distribution.

| Degrees average diameter | 2.1 | 2.3 | 2.5 | 2.7 | 2.9 | 3.1 | 3.3 | 3.5 | 3.7 | 3.9 | 4.1 | 4.3 | 4.5 | 4.7 | 4.9 |
|---|---|---|---|---|---|---|---|---|---|---|---|---|---|---|---|
| Number subjects | 0 | 4 | 4 | 8 | 2 | 1 | 0 | 0 | 1 | 1 | 0 | 2 | 1 | 0 | 0 |

Though but one embodiment of the invention is shown, it is apparent that other forms and arrangements of parts can be used without departing from the spirit of the invention, and the invention is not to be limited to the form shown, the scope thereof being defined by the appended claims.

The invention described herein may be manufactured and used by or for the Government of the United States of America for governmental purposes without the payment of any royalties thereon or therefor.

What is claimed is:

1. A device for testing individual dark adaptability comprising a housing, a radium plaque mounted in said housing, a filter mounted adjacent the face of said radium plaque, a fixation means positioned forward of the mid point of said radium plaque, an adjustable diaphragm shutter surrounding said fixation means and adjustable against the fixation means to fully close the front of the housing against the passage of light from said plaque, said shutter having a control member for regulating the size of the opening in the shutter, and a calibrated member adjacent said control member for indicating the size of the shutter opening.

2. A device for testing individual dark adaptability and for determining the size of the cone area of the individual's eyes, comprising in a housing, a self-luminous plaque, a filter facing said plaque, a fixation light forward of said filter and positioned substantially centrally of said plaque and filter, adjustable means for controlling the admission of light from said plaque, said light controlling means surrounding said fixation light and comprising an iris diaphragm shutter adjustable against said fixation light in closed position of said iris diaphragm shutter to leave the fixation light constantly exposed during the testing, and means for indicating the adjusted minimum position of said light controlling means at which the individual first observes light from said plaque around said fixation light, to determine the size of the cone area of the eyes of the individual corresponding to said adjusted position.

3. A device for testing individual visual dark adaptability, comprising a housing, a vertically disposed radium plaque mounted in said housing, a circular light bulb housing mounted on a narrow support arm secured in said housing and providing electrical connection for said light bulb with a suitable electrical source, said circular light bulb housing being centrally positioned forward of the mid point of the radium plaque and providing a central fixation point, a diaphragm shutter mounted on said housing, said shutter surrounding said circular light bulb housing, and engaging the circular light bulb housing in the completely closed position of said shutter.

4. In a device for testing individual visual dark adaptability according to claim 2, said central fixation light including red filter means reducing the light to low cone level of brightness, and said self-luminous plaque comprising a radium plaque having a brightness of 2.5 log micromicrolamberts to 8.0 log micromicrolamberts.

JOHN H. KORB.

REFERENCES CITED

The following references are of record in the file of this patent:

UNITED STATES PATENTS

| Number | Name | Date |
| --- | --- | --- |
| 1,072,813 | Black | Sept. 9, 1913 |
| 2,240,156 | Feldman | Apr. 29, 1941 |
| 2,283,769 | Schwanzel | May 19, 1942 |
| 2,406,596 | Ellis | Aug. 27, 1946 |